(12) United States Patent
Buckler et al.

(10) Patent No.: US 8,839,339 B2
(45) Date of Patent: Sep. 16, 2014

(54) BLADE CENTER KVM DISTRIBUTION

(75) Inventors: Gerhard N. Buckler, Orefield, PA (US);
Eric Kern, Chapel Hill, NC (US);
Johnny Nieves, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 12/103,219

(22) Filed: Apr. 15, 2008

(65) Prior Publication Data

US 2009/0260047 A1 Oct. 15, 2009

(51) Int. Cl.
*H04N 7/173* (2011.01)
*H04N 7/16* (2011.01)
*G06F 13/14* (2006.01)
*G06F 15/173* (2006.01)

(52) U.S. Cl.
USPC ............ 725/143; 725/116; 710/305; 709/238

(58) Field of Classification Search
USPC .............. 725/91–93, 103, 114–116, 144–146
See application file for complete search history.

(56) References Cited

U.S. PATENT DOCUMENTS

| | | | |
|---|---|---|---|
| 6,915,362 B2 * | 7/2005 | Ramsey et al. ................. | 710/62 |
| 6,976,112 B2 | 12/2005 | Franke et al. | |
| 7,003,563 B2 | 2/2006 | Leigh et al. | |
| 7,137,014 B2 | 11/2006 | Dake et al. | |
| 2002/0124128 A1 * | 9/2002 | Qiu .............................. | 710/302 |
| 2004/0103327 A1 * | 5/2004 | Dake et al. .................... | 713/300 |
| 2004/0222944 A1 * | 11/2004 | Sivertsen ...................... | 345/502 |
| 2005/0021654 A1 * | 1/2005 | Kern et al. ..................... | 709/211 |
| 2005/0108451 A1 | 5/2005 | Covington et al. | |
| 2005/0160346 A1 * | 7/2005 | Yamane ........................ | 714/776 |
| 2006/0002427 A1 * | 1/2006 | MacInnis et al. ............. | 370/477 |
| 2006/0143473 A1 | 6/2006 | Kumar | |
| 2006/0222344 A1 * | 10/2006 | Ukai et al. ..................... | 386/123 |
| 2006/0294254 A1 * | 12/2006 | Emerson et al. .............. | 709/238 |
| 2007/0033289 A1 * | 2/2007 | Nuyttens et al. .............. | 345/501 |
| 2007/0047536 A1 * | 3/2007 | Scherer et al. ................ | 370/360 |
| 2007/0083723 A1 * | 4/2007 | Dey et al. ...................... | 711/163 |
| 2007/0124474 A1 * | 5/2007 | Margulis ....................... | 709/226 |
| 2008/0120675 A1 * | 5/2008 | Morad et al. .................. | 725/120 |
| 2008/0126627 A1 * | 5/2008 | Chandrasekhar et al. ...... | 710/62 |
| 2008/0162958 A1 * | 7/2008 | Bozek et al. .................. | 713/310 |
| 2009/0077609 A1 * | 3/2009 | Bichot et al. .................. | 725/127 |
| 2009/0157867 A1 * | 6/2009 | Farmer et al. ................. | 709/224 |

OTHER PUBLICATIONS

Buyya, Rajkumar, Toni Cortes, and Hai Jin. High Performance Mass Storage and Parallel I/O: Technologies and Applications. 1. New York: Wiley-IEEE Press, 2001. 617-632. Print.*
Canfield, D. "IBM eServer Blade Center", ACM Digital Library, 2006, 3 pages.
Felter, WM. et al., "On the Performance and Use of Dense Servers", IBM Journal, Sep./Nov. 2003, vol. 47, pp. 671-688, No. 5/6.
Stevens, A., "Cutting-Edge or Blunt Instrument?", PC Pro, Apr. 2006, p. 174-176, Issue 138.

* cited by examiner

*Primary Examiner* — Randy Flynn
(74) *Attorney, Agent, or Firm* — Andrea Bauer; Hoffman Warnick LLC

(57) ABSTRACT

A system and method for providing redundant video signals from a server blade in a blade center. A blade center is described that includes a capture system for capturing a video stream off a PCI-x bus in a server blade and delivering the pair of video streams to a midplane in the blade center; and a switch module that inputs the pair of video streams and generates an unroutable video signal and a routable video signal.

14 Claims, 2 Drawing Sheets

US 8,839,339 B2

BLADE CENTER KVM DISTRIBUTION

FIELD OF THE INVENTION

The present invention relates generally to keyboard video mouse (KVM) signals being communicated between a blade server and a blade client, and more particularly to a system and method of providing redundant video signals from a blade server.

BACKGROUND OF THE INVENTION

A blade center or chassis generally consists of a plurality of blade servers that can serve applications and data to clients of the blade center. Blade centers provide an infrastructure in which high end processing can occur at a central location thus eliminating the need to distribute and provide support to applications at remote sites. One example involves keyboard video mouse (KVM) applications, in which high-end video applications are run on the server blades and delivered to remote blade clients based on keyboard and mouse commands inputted by an end user at the client site.

One of the issues currently faced with such applications is the lack of flexibility to handle different types of communication technologies such as KVM over IP (internet protocol), point-to-point cable KVM, wireless KVM, etc. A typical blade center is not equipped to support different types of communication protocols, as each such technology may require a unique hardware/firmware/software implementation at the blade center, which limits the types of technologies provided by a blade center. Accordingly, a need exists for a more flexible approach for blade centers to allow for multiple technologies.

SUMMARY OF THE INVENTION

The present invention relates to a system and method of providing redundant video signals using different communication protocols in a blade server environment. In one embodiment, there is a system for providing redundant video signals from a server blade in a blade center, comprising: a capture system for capturing a video signal from a video chipset in the server blade, wherein the capture system duplicates and encapsulates the video signal into a pair of video streams and delivers the pair of video streams to a midplane in the blade center; and a switch module that decapsulates the pair of video streams and generates an unroutable video signal and a routable video signal.

In a second embodiment, there is a blade center having a plurality of server blades, each capable of running a KVM (keyboard video mouse) application for a blade client, comprising: a plurality of daughter cards each coupled to an associated server blade that reads a video signal off a bus in the server blade and diverts the video signal to a midplane; and a switch module that reads the video signal from the midplane and generates a first video signal using a first communication protocol and a second video signal using a second communication protocol.

In a third embodiment, there is a method of providing redundant video signals from a server blade in a blade center, comprising: reading a video signal off a bus generated by a hardware chipset in the server blade; duplicating and encapsulating the video signal into a pair of video streams; delivering the pair of video streams to a switch module via a midplane in the blade center; decapsulating the pair of video streams; and generating an unroutable video signal and a routable video signal.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
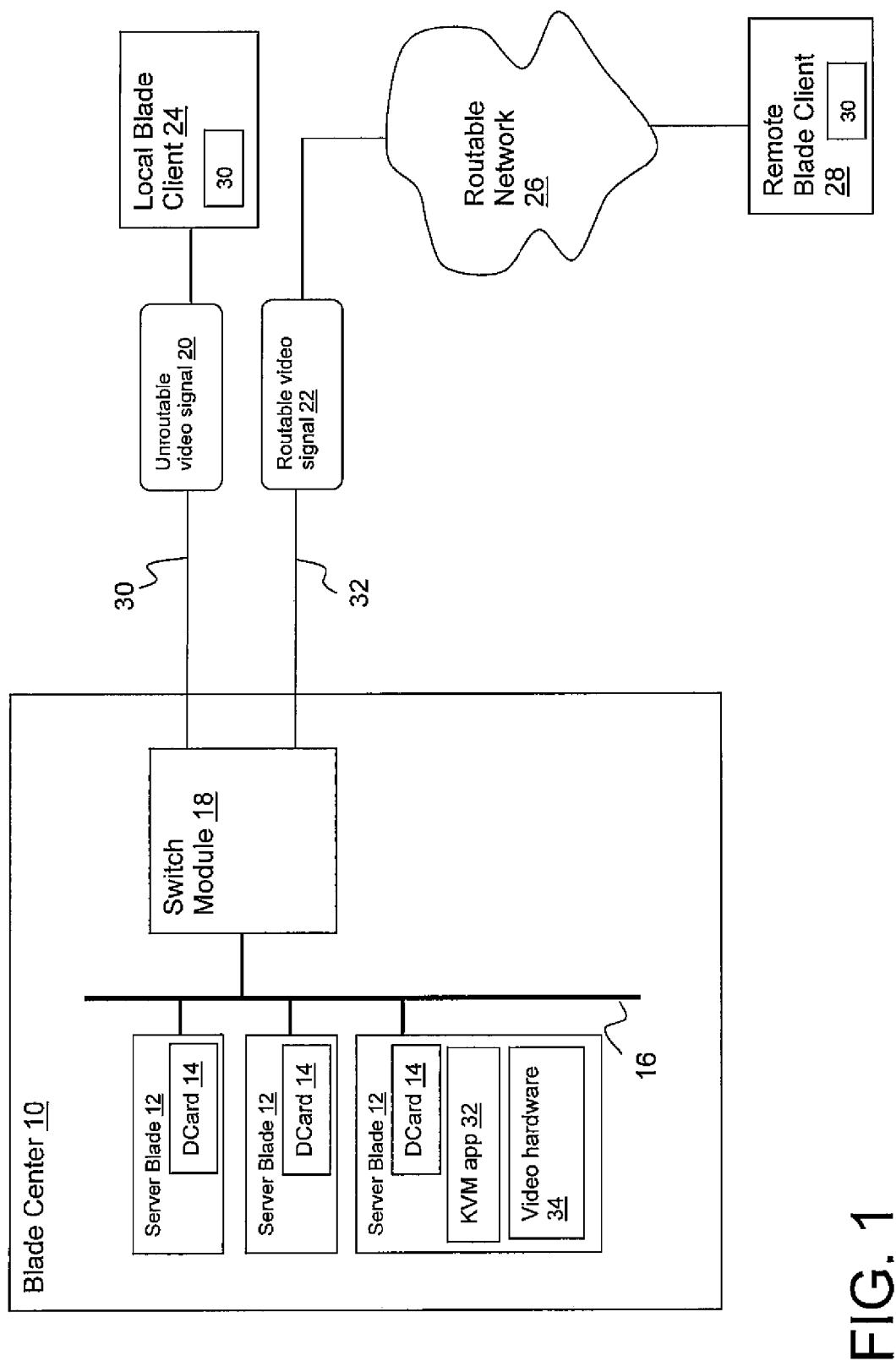
FIG. 1 depicts a computer system blade center in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 depicts an illustrative embodiment of a blade center 10 having a plurality of server blades 12 and a switch module 18 capable of generating redundant video signals using different communication protocols. In this illustrative embodiment, blade center 10 is configured to provide an unroutable video signal 20 and a routable video signal 22, from anyone of the server blades 12. Video signals 20, 22 may for instance be provided by a KVM (keyboard, video, mouse) application 32 running on one of the server blades 12. KVM application 32 provides high performance video signals from video hardware 34 to a blade client 24, 28 in response to keyboard and mouse inputs.

The unroutable video signal 20 generally comprises a direct proprietary signal that provides point-to-point high bandwidth communications with a local blade client 24. A breakout cable 30 (e.g., cat5 or cat6 Ethernet) may be used to carry the unroutable video signal 20 to the local blade client 24 (typically within about 325 feet).

Routable video signal 22 may for instance be transmitted as a TCP/IP signal on a network cable 32 that is connected to a routable network 26 (e.g., the Internet). Routable video signal 22 is transmittable via the routable network 26 to a remote blade client 28. In KVM application 32, both the local blade client 24 and remote blade client 28 are loaded with a decoding system 30 for decoding KVM video signals.

In this illustrative configuration, each server blade 12 is provided with a daughter card (DCard 14). The daughter card 14 captures a video signal from a PCI-x bus generated by onboard video hardware 34 in the server blade 12, and delivers the signal to switch module 18 via midplane 16. Switch module 18 then generates both an unroutable and routable video signal 20, 22 for use by a blade client 24, 28. This thus allows a user the flexibility of engaging in a session from either a local blade client 24 (which will generally provide higher performance) or a remote blade client 28, accessed via either a wired or wireless connection to the Internet.

Figure 2:
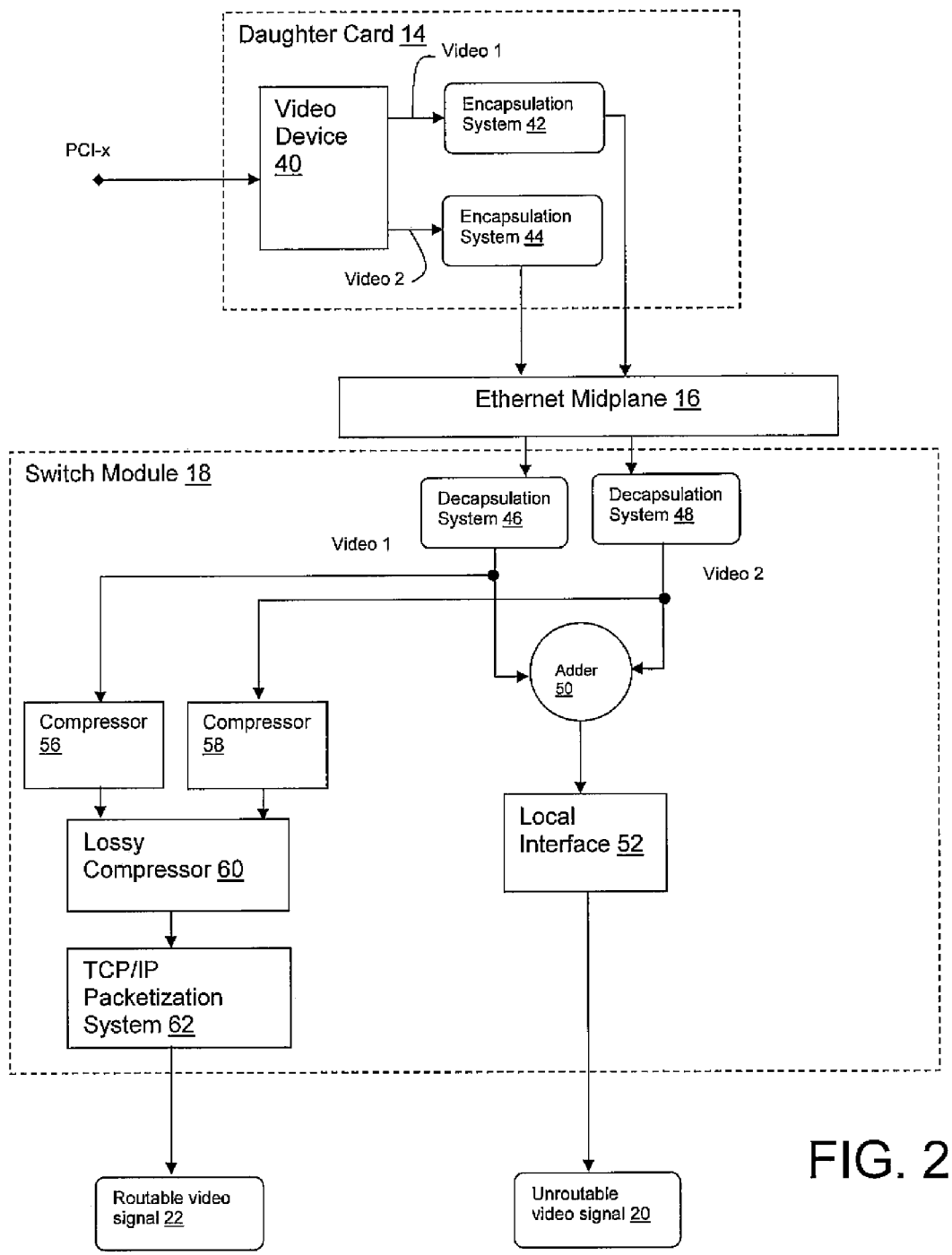
FIG. 2 depicts a daughter card and switch module for a blade center in accordance with an embodiment of the present invention.

FIG. 2 depicts a detailed example of the implementation of the daughter card 14 and switch module 18. As shown, daughter card 14 includes a video device 40 that takes a video signal off the PCI-x bus and duplicates the signal into separate video 1 and a video 2 streams. The video 1 and a video 2 streams are each then encapsulated by encapsulation systems 42, 44, respectively. The encapsulated streams are then fed via the Ethernet midplane 16 to decapsulation systems 46, 48 to recreate the video 1 and video 2 streams in the switch module 18. An adder 50 is provided to combine the two streams to generate the unroutable video signal 20 via a local interface 52.

In addition, the video 1 and video 2 streams are fed into a pair of compressors 56, 58, respectively, and the outputs are fed into a lossy compressor 60 which combines the streams and provides addition compression. The resulting stream is then fed into a TCP/IP packetization system 62 that creates the routable vide signal 22. Note that while this embodiment describes providing redundant unroutable and routable video signals 20, 22, it is understood that the redundant video signals could be implemented using any known communication systems and protocols.

It is also understood that daughter card 14 and switch module 18 may be implemented as any type of computing infrastructure. Such a computing infrastructure may include a processor, input/output (I/O), memory, and bus. Memory may comprise any known type of data storage such as random access memory (RAM), read-only memory (ROM), a data cache, etc.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the and likewise may comprise any known type of transmission link, including electrical, optical, wireless, etc. Although not shown, additional components, such as cache memory, communication systems, firmware, system software, etc., may be incorporated into the computing infrastructure.

The generated video signals 20, 22 may be packaged for transmission and use over a direct connection or network such as the Internet, a local area network (LAN), a wide area network (WAN), a virtual private network (VPN), etc. Communication could occur via a direct hardwired connection, or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. Blade center 10 may be implemented with any number of ports to support the protocols being supported.

It is understood that in addition to being implemented as a system and method, some of the features may be provided as a program product stored on a computer-readable medium, which when executed, enables the computing infrastructure to generate multiple video signals from a server blade. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system, etc.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for providing redundant video signals from a server blade in a blade center, comprising:
    a capture system for capturing a video signal from a video chipset in the server blade, wherein the capture system duplicates and encapsulates the video signal into a pair of video streams and transmits the pair of video streams to a midplane in the blade center; and
    a switch module that decapsulates the pair of video streams and generates an unroutable video signal by combining the pair of video streams with an adder, wherein the pair of video streams are duplicate streams, and processing a resulting output stream of the adder with a local interface, and a routable video signal from one of the pair of video streams, wherein the unroutable video signal comprises a proprietary signal with point-to-point communication with a local blade client, and wherein the unroutable video signal and the routable video signal comprise different formats of the captured video signal.

2. The system of claim 1, wherein the capture system comprises a daughter card that reads the video signal off a PCI-x bus.

3. The system of claim 1, wherein the routable video signal is generated by passing the pair of video streams through a pair of compressors, combining a result using a lossy compressor, and packetizing a resulting stream using a TCP/IP packetization system.

4. The system of claim 1, wherein the video signal is generated from a KVM (keyboard, video, mouse) application.

5. The system of claim 1, wherein the unroutable video signal and routable video signal are decodable at a blade client.

6. A blade center having a plurality of server blades, each capable of running a KVM (keyboard video mouse) application for a blade client, comprising:

a plurality of daughter cards each coupled to an associated server blade that reads a video signal off a bus in the server blade and diverts the video signal to a midplane; and a switch module that reads the video signal from the midplane and generates a first video signal using a first communication protocol and a second video signal using a second communication protocol, wherein the first video signal is processed to generate a routable video signal and wherein the first video signal and the second video signal are combined with an adder, wherein the first video signal and the second video signal are duplicate signals, and a resulting output stream from the adder is processed at a local interface in order to generate an unroutable video signal which comprises a proprietary signal with point-to-point communication with a local blade client, and wherein the routable video signal and the unroutable video signal comprise different formats of the video signal.

7. The blade center of claim 6, wherein the first communication protocol comprises TCP/IP.

8. The blade center of claim 7, wherein the second communication protocol comprises a point-to-point protocol.

9. The blade center of claim 6, wherein video signal is generated by a hardware chipset on the server blade.

10. A method of providing redundant video signals from a server blade in a blade center, comprising:

reading a video signal off a bus generated by a hardware chipset in the server blade;

duplicating and encapsulating the video signal into a pair of video streams;

delivering the pair of video streams to a switch module via a midplane in the blade center;

decapsulating the pair of video streams; and generates an unroutable video signal by combining the pair of video streams with an adder adder, wherein the pair of video streams are duplicate streams, and processing a resulting output stream of the adder with a local interface, and a routable video signal from one of the pair of video streams, wherein the unroutable video signal comprises a proprietary signal with point-to-point communication with a local blade client, and wherein the unroutable video signal and the routable video signal comprise different formats of the captured video signal.

11. The method of claim 10, wherein reading the video signal off the bus utilizes a daughter card that reads the video signal off a PCI-x bus.

12. The method of claim 10, wherein the routable video signal is generated by passing the pair of video streams through a pair of compressors, combining a result using a lossy compressor, and packetizing a resulting stream using a TCP/IP packetization system.

13. The method of claim 10, wherein the video signal is controlled by a KVM (keyboard, video, mouse) application.

14. The method of claim 10, wherein the unroutable video signal and routable video signal are decodable at a blade client.

* * * * *